United States Patent [19]

Lansing et al.

[11] 4,017,837
[45] Apr. 12, 1977

[54] DATA ENTRY SYSTEM

[75] Inventors: Charles W. Lansing, Lake Monroe; Joseph S. Zajicek, Orlando, both of Fla.

[73] Assignee: TDX, Inc., Orlando, Fla.

[22] Filed: July 25, 1975

[21] Appl. No.: 599,119

Related U.S. Application Data

[63] Continuation of Ser. No. 392,663, Aug. 29, 1973, abandoned.

[52] U.S. Cl. .......................................... 340/172.5
[51] Int. Cl.² ...................... G06F 3/08; G06F 3/10
[58] Field of Search .................... 340/172.5; 445/1; 235/61.1; 234/63

[56] References Cited

UNITED STATES PATENTS

| | | | |
|---|---|---|---|
| 2,318,299 | 5/1943 | Doty | 340/172.5 X |
| 3,069,075 | 12/1962 | Sallach | 234/63 |
| 3,403,225 | 9/1968 | Mislan et al. | 340/172.5 X |
| 3,842,245 | 10/1974 | Schneiderhan | 235/61.1 |

OTHER PUBLICATIONS

IBM - *An Introduction to IBM Punched Card Data Processing* - 1962, pp. 1-8, Form No. F20-0074-IBM Corp., White Plains, N.Y.
IBM Reference Manual-870 *Document Writing System*, pp. 1-7, 17 and 21, A24-1036-1, 1961 - IBM Corp., White Plains, N.Y.

*Primary Examiner*—Harvey E. Springborn
*Attorney, Agent, or Firm*—James N. Dresser

[57] ABSTRACT

A data recording system by means of which data can be typed on a form and subsequently automatically punched into the same or a different form. A typewriter is coupled to a memory so that as data is typed onto the form the data is captured in the memory. After the typing of the form has been completed, the same form or a different form is inserted into a card punch which is also coupled to the memory, and the same data is punched into that form. When the same form is typed and punched the form is usable both as a business document readable by people and as an input document to a data processing system.

2 Claims, 3 Drawing Figures

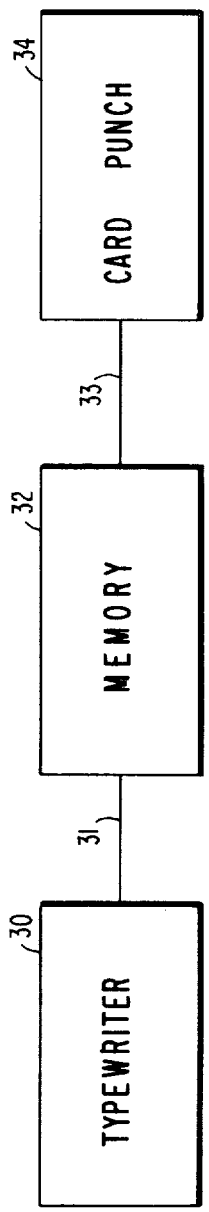

DATA ENTRY SYSTEM

This is a continuation of application Ser. No. 392,663, filed Aug. 29, 1973, now abandoned.

The present invention pertains to a data recording system. More particularly, the present invention pertains to a data recording system for preparing data for use in every-day business operations and for preparing the same data for input to a data processing system.

Many business procedures are adaptable to performance on automatic data processing equipment. To be performed on automatic data processing equipment and to also provide written records necessary for every-day business operations require that the data be recorded both in a written form, readable by people using it every day, and in a form usable as an input to the automatic data processing system.

By way of example, accounting records of many businesses are frequently kept on automatic data processing equipment. Consequently, transactions involving such a business's accounting records must be maintained in a form readable by the people who must deal with them every day and must also be provided in a form suitable for use as the input to the automatic data processing system. When such a business sends out invoices or statements for money due it, for example, these must be written in a form readable by the persons to whom they are to be sent. In addition, if automatic data processing equipment is to maintain an accounts receivable ledger for the business, then that same information must be provided in a form suitable for use as an input to the data processing system. Likewise, when such a business pays someone, either paying for goods or services purchased or paying its own employees, the transaction affects the accounting records. The payment must be made in a negotiable form such as a commercial check, and a record of the payment must be provided in a form readable by the data processing equipment, so that the business's accounting records can be properly maintained.

As another example, consider the issuance of automobile registration plates. When the owner of an automobile wishes to obtain registration or license plates for his automobile, he goes to the appropriate governmental agency and completes a form. This form may have further information added to it by personnel working for the issuing agency, and then the license plates are issued to the automobile owner. Information from that form then must be provided to a data processing system if the licensing entity utilizes such a system to maintain its automobile registration records.

A third illustration is an inventory control system in a company. When an item is requisitioned from inventory, a requisition form is filled out, and the desired item is obtained. If an automatic data processing system is to be utilized to maintain inventory records, the information from the requisition form must be supplied as input data to the data processing system.

Heretofore it has been necessary in systems of these types to perform two separate manual operations in order to complete the necessary steps. First, the form to be read by the people involved in the operation is completed. This form might be the invoice or bill or it might be the check in the accounting system. Similarly, in the automobile registration system, the form would be the automobile license registration form, and in the inventory control system it would be the requisition form. In each of these situations, the form is relatively brief, generally not having more than eighty data characters entered on it. Second, the information from the form must be transferred to a type usable as an input to the automatic data processing system. Frequently this involves another operator reading information from the first form and operating a machine such as a key punch or card punch which punches cards that are usable as input documents for the automatic data processing system. Key punch machines for this purpose are widely known. This second manual step of transferring the information from the initial form to the data processing system input document, such as the punched card, introduces the possibility of errors being made in transfer. In data card punching operations it is frequently the practice to have the data punched onto a set of cards by one operator and then to have the same data verified, perhaps by a different operator, to verify the accuracy of the initial punching. This verification step does eliminate a large majority of the key punch or transfer errors before the data is introduced into the data processing system; however, it does not necessarily eliminate all such errors. The same error could be made in both the initial card punching and in the verification card punching, either coincidentally or because of an inability to properly read the information manually entered on the initial form. In either event, an error exists between the data as properly should be recorded and the data actually introduced into the data processing system. Even when errors are eliminated by a verification step, this is an expensive and time-consuming operation.

The present invention is a system for providing in a single document both data in a written form readable by persons working with it and the exact same data in a form usable as an input to a data processing system. In accordance with a preferred embodiment of the present invention the data is typed onto a form. At the same time, the data as typed is captured in a memory. Once the typing is completed, the form is removed from the typewriter and inserted into a card-punching machine coupled to that same memory. The data as captured in the memory is then punched into the form. The single from then becomes both the business document, such as a commercial check or an automatic registration form, and the data processing system input document. Since the data is punched onto the form automatically from the memory, the data as punched is identical with the data as typed on the form. Consequently, no error is introduced by the data punching process and there is no necessity for a verification step.

If desired that data could be typed onto one form and punched into another. Numerous applications exist, however, for a single form having the data both typed and punched thereon.

A detailed description of the system of the present invention will be given in conjunction with an accounting operation. As indicated, however, the present invention is useful in numerous business operations, not simply accounting.

In an accounting operation, when checks are to be made out in accordance with the present invention, a blank check form is inserted into the typewriter of the system of the present invention. Data is typed onto that check. The data might include the account numbers to be debited and credited and the amounts attributable to each such account. Additionally, the data includes necessary information such as the check number and date and a number identifying the payee. Information s on a standard check is additionally typed, including numerical and a written form of the amount of the heck and the name of the payee. The data which is to e punched into the check is captured in a memory as ιe typing takes place, and after all the data has been /ped, the check is removed from the typewriter and ιserted into a card punch which is also coupled to the ιemory. The card punch is then activated, and the ata from the memory is punched into the same card. ˙he card then serves as the check, which is sent to the ayee. After the check has been processed through sual banking channels, it is used as the input docu- ιent for the data processing system which does the ccounting for the drawer of the check.

The check is transmitted to the payee, who processes as he would any other check. Thus, for example, the ayee endorses it and deposits it in his bank. The check ιakes its way through the usual banking channels to ₂turn to the bank of the drawer in which it is debited gainst his account. Periodically, for example monthly, ιe bank sends a statement and all of the cancelled hecks to the drawer as in any other checking account. he drawer then transmits all his cancelled checks for ιat month to his data processing equipment for use an ιput documents to the data processing system which ιaintains his accounting records. This might be a data rocessing system located at his place of business for is exclusive use. Alternatively, it might be a data pro- ₂ssing system located at a service organization provid- ιg as a service the generation and maintenance of such ccounting records. Since the check itself is utilized as ιe input document for the automatic data processing ⁄stem, and since the typed data and the punched data n the check are identical, there is no possibility of an rror being introduced between the typed data and the ata provided to the data processing system. Conse- uently, the accounting records are assured of having ebited the amount for which the check was drawn.

It is, of course, possible that the person typing the heck could make an error. This, however, is an error ˙hich could be recognized from reading the data on ιe check. In such a case a new check would be pre- ared, and the old check destroyed. Therefore, the rroneous data would never be introduced into the ccounting records. Even if the erroneous check is sent ₎ the payee, the error would be in the amount paid to im, and the amount paid to him would be properly ntered into the drawer's accounting records. There ˙ould be no error between the amount paid and the ata provided to the data processing system handling ιe accounting records.

Once the data is in the data processing system that ⁄stem can, of course, provide any desired accounting ₂cords. Thus the data processing system might main- ιin the company's general ledger; it might provide ιnancial statements on the cash basis for the current ₂eriod; it can maintain employee earning records; it an maintain vendor activity reports, a ledger of cash ₂ceipts and cash disbursements, and any other reports nd records desired by the company. If the company lso generates its bills in a system in accordance with ιe present invention, the data processing system can ιaintain accounts receivable ledgers and customer ctivity reports. It is known to utilize automatic data rocessing system to provide these various accounting ₂cords. In previously known system for this purpose, owever, it was necessary to take source documents, uch as cancelled checks and invoices, and to manually prepare data from them for input into the data processing system, for example by means of a card punch or key punch machine. This manual operation is not only time consuming but also is a source of error.

The expense involved in the manual key punching and verification operations required of previously known automatic data processing systems used to maintain accounting records has made the use of automatic data processing systems impractical for the maintenance of accounting records of many small businesses, for example, sole practitioners of a profession such as doctors, lawyers, and certified public accountants, and family-run businesses. Most businesses, however small, have a typewriter. Since the present system requires only a memory and card punch, in addition to a typewriter, its equipment cost is quite low, and since only the single manual step of typing the form is required, and this manual step is generally done in businesses using manual accounting methods, the operating cost is minimal. Therefore, the system of the present invention makes the use of automatic data processing systems for the maintenance of business records practical for such small businesses. The typewriter utilized to prepare the source documents in the system of the present invention is slightly modified from a standard typewriter to make it usable in the system, but the typewriter is preferably provided in a form which permits its use for standard typing as well as its use in the system of the present invention.

These and other aspects and advantages of the present invention are more apparent in the following detailed description and claims, particularly when considered in conjunction with the accompanying drawings, in which like parts bear like reference numerals. In the drawings:

FIG. 1 illustrates a form suitable for use to provide both a written record and an input document for a data processing system in accordance with the present invention;

FIG. 2 is a block diagram of a preferred embodiment of a data recording system in accordance with the present invention.

Figure 3:
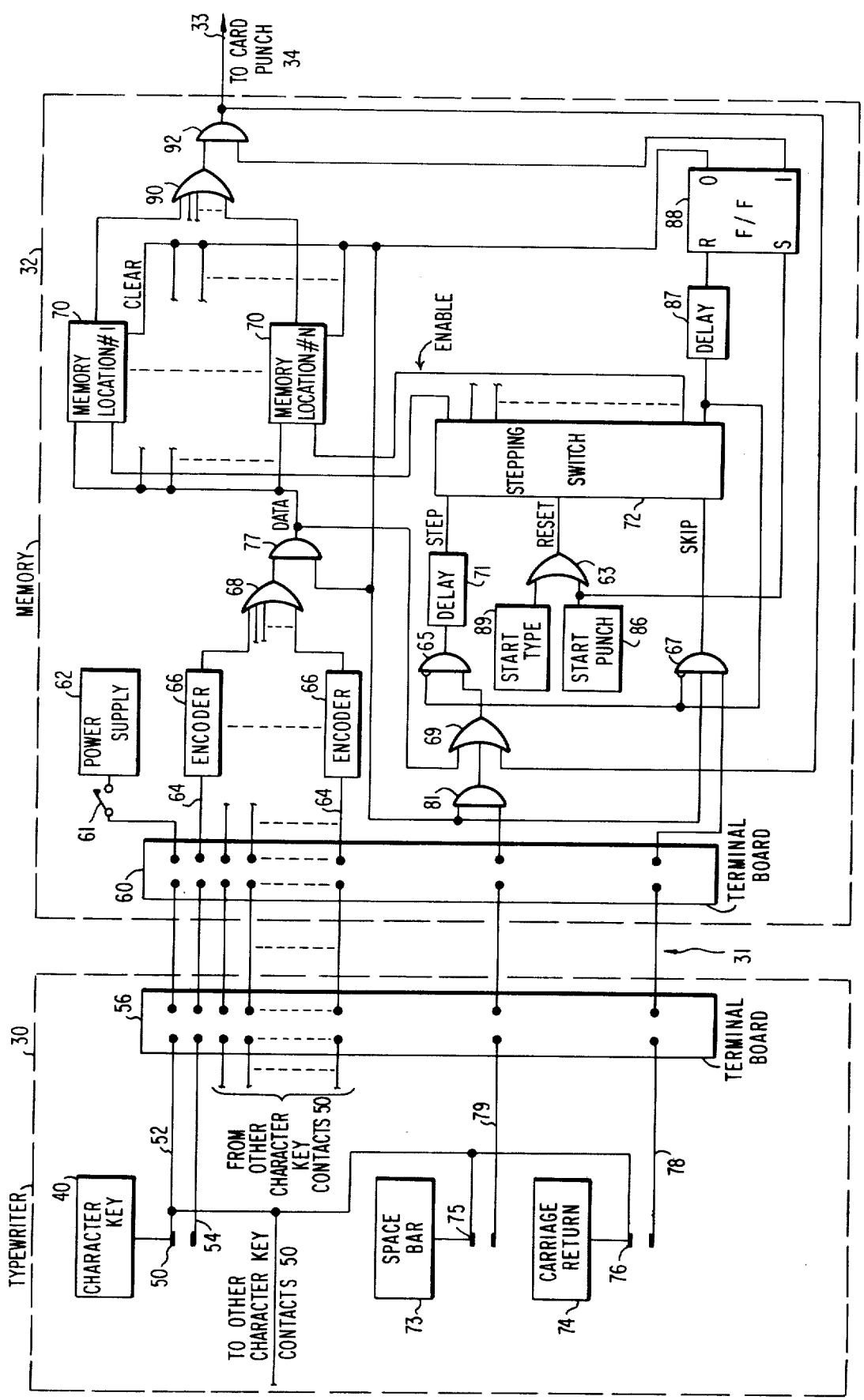
FIG. 3 is a schematic block diagram of a portion of a data recording system in accordance with FIG. 2, illustrating one manner of implementing the system in accordance with the present invention.

FIG. 1 illustrates a typical form to be utilized in conjunction with the present invention to provide both a written record of data and a punched record of that same data for use as an input document to an automatic data processing system. As an illustrative example, FIG. 1 shows a commercial check 10 which is made in the configuration of a data processing card. Preferably the check 10 is provided as a two-part form, having an upper, soft copy and a lower, hard copy, with a carbon paper between or other means of having identical data printed on the two copies by a single typing operation. After all of the data is typed, the upper, soft copy is removed and retained for file purposes, while the lower, hard copy is inserted into a card punch, and the typed data is then punched into the card under the control of a memory.

When as in the illustrative example of FIG. 1 the form 10 is a commercial check, the form has on it the usual data contained on a blank check. Thus, by way of example, check 10 has on it the name of the drawer, illustratively shown in FIG. 1 as "XYZ Corporation", and, if desired, its address, the name of the bank on which the check is drawn, illustratively shown in FIG. 1 as "First Local Bank", and that bank's location and identifying number, and the drawer's bank account number in machine-readable form. Blank check form 10 additionally has spaces into which are to be typed numerical data which are also captured in memory for subsequent punching into check 10. Thus, by way of illustration, check 10 has a column 12 for numbers identifying accounts on the drawer's accounting records to be debited or credited, a column 13 for entry of a code character designating whether a debit or credit is to be recorded, and a column 14 for the amounts of each debit and credit. A plurality of rows or lines 16 are provided for each of the columns 12, 13 and 14 to accommodate a plurality of account entries. Blank check form 10 additionally has a data line 17, the first space of which is a space 18 for entry of a number identifying the drawer on the records of the data processing service organization, in the event the drawer does not have its own data processing system. Further, data line 17 has a space 20 for entry of a check number, spaces 22 for entry of the date of the check in numerical form, a space 24 for entry of a number identifying the payee on the accounting records of the drawer, and a space 26 for entry of the amount of the check in numerals.

All of the numerical data that is typed into spaces 12–26 is simultaneously captured in a memory as it is typed. Blank check form 10 additionally includes spaces customarily found on commercial checks, such as a line 27 for entry of the name of the payee, a line 28 for entry of the written out amount of the check, and a line 29 for signature by the drawer or its authorized agent. The entries in lines 27, 28 and 29 are not captured in memory, the entries in lines 27 and 28 being ascertainable from the entries in spaces 24 and 26 which are captured in memory.

Preferably, form 10 is a two part form so that the data typed on it is obtained in duplicate. If form 10 is a blank check form, then the top, soft copy can be used by the drawer for internal filing purposes, while the lower, hard copy, which is the check, has the data punched into it and is then sent to the payee. After the check has been cashed and processed through the banking channels, it is returned to the drawer with his bank statement. The drawer then sends the cancelled check to the data processing system for use as an input document. Disposition of the soft and hard copies varies with the type of form and with the desires of the user. Thus, if form 10 is a bill or an invoice, the soft copy can be sent to the customer, while the hard copy has the data punched into it and is then sent directly to the data processing system for use as an input document for the preparation of various reports, such as accounts receivable reports. Alternatively, the soft copy can be used only internally, while the hard copy with the data punched into it, is sent to the data processing center which then compiles a composite bill for each customer from all the invoices for a specified period of time. Likewise, if desired, the soft copy of the check form can be the negotiable check, while the hard copy is retained by the drawer and used only as a data processing system input document.

FIG. 2 depicts a preferred embodiment of a data input system in accordance with the present invention in block diagram form. A typewriter 30 is coupled by cable 31 to memory 32 so that as characters are typed on typewriter 30, these characters can be stored in memory 32. Memory 32 has a number of memory locations conforming with the number of character spaces which can be recorded on form 10. One standard data processing system punched card is capable of recording eighty characters of data. Accordingly, if form 10 conforms to this standard, memory 32 has the capability of storing eighty data characters. These data characters are stored within memory 32 in memory locations corresponding with the character locations on form 10. The output of memory 32 is connected by cable 33 to card punch 34 which is capable of punching the coded data characters into form 10.

FIG. 3 illustrates one manner of implementing the data recording system in accordance with the present invention. Power supply 62, within memory 32, has its output coupled through switch 61 to one terminal on terminal board 60 of memory 32. A conductor within cable 31 couples that power terminal of terminal board 60 to an input power terminal on terminal board 56 of typewriter 30. Typewriter 30 is a conventional typewriter which is adapted for use in the system of the present invention. Typewriter 30 includes the conventional character keys 40 which operate its type. Each character key 40 of typewriter 30 has been modified so that when a key 40 is actuated, a uniquely associated set of contacts 50 is closed, providing continuity between power line 52, which is connected to the power terminal of terminal board 56, and an output line 54 associated with that particular character key. Each output line 54 is connected to terminal board 56 which couples the output lines 54 to uniquely associated conductors within cable 31. Each of these conductors is coupled by terminal board 60 to an input line 64 of a uniquely associated encoder 66. There is thus an output line 54, a conductor within cable 31, and an encoder 66 with an input line 64 for each character key 40 of typewriter 30. By way of example, if a particular key 40 is utilized to type the letter character N, then when that key 40 is actuated, the associated encoder 66 is activated by a signal applied to it on its input line 64, and that associated encoder 66 provides as an output a coded representation of the letter N, for example a binary coded representation such as a representation in accordance with the American Standard Code for Information Interchange (ASCII). Thus, when a key 40 is actuated, power from power supply 62 passes through terminal board 60, the power conductor of cable 31, terminal board 56, power line 52, the contacts 50 of that key 40, output line 54, terminal board 56, the conductor within cable 31 that is associated with that key 40, terminal board 60, and an input line 64 to an encoder 66 uniquely associated with that key 40. In response, that encoder 66 provides as an output a coded representation of the data character represented by that key 40.

The output of each encoder 66 is supplied as an input or OR gate 68. The output of OR gate 68 is connected to one input of AND gate 77, the output of which is tied to the data input of each of a plurality of memory locations 70. There is a memory location 70 provided for each character location on form 10. Thus, by way of example, if form 10 is capable of having punched into it 80 characters of data, then there are eighty memory locations 70 provided.

The output of AND gate 77 is also applied through OR gate 69 to the non-inhibiting input of INHIBITED-AND gate 65, the output of which is applied through delay circuit 71 to the step input of stepping switch 72.

switch 72 can be a solid state or an electro-mechanical stepping switch. On typewriter 30, carriage return key 74 is connected so that, when key 74 is depressed, contacts 76 are closed, applying power from power line 52 to output line 78 which is tied to a terminal on terminal board 56. The mating terminal of terminal board 56 is connected by a conductor in cable 31 to a terminal on terminal board 60 of memory 32. Terminal board 60 couples this terminal to a non-inhibiting input of INHIBITED-AND gate 67 which has its output tied to a skip input of stepping switch 72.

Start Punch control 86 has its output coupled through OR gate 63 to the reset input of stepping switch 72. Start Type control 89 has its output connected to the other input of OR gate 63. Stepping switch 72 has a number of discrete output signal lines equal to the number of memory locations 70. Each of these output signal lines of stepping switch 72 is connected to the enabling input of a uniquely associated one of the memory locations 70. In addition, stepping switch 72 has another output line connected through delay circuit 87 to the reset input of bistable multivibrator or flip-flop 88 and connected to the inhibiting inputs of INHIBITED-AND gates 65 and 67. The output of Start Punch switch 86 is connected to the set input of flip-flop 88.

Each memory location 70 has its output connected to an input of OR gate 90, the output of which is tied to one input of AND gate 92. The ONE output of flip-flop 88 is connected to the second input of AND gate 92, while the ZERO output of flip-flop 88 is connected to the reset or clear input of each memory location 70. The ZERO output of flip-flop 88 is also connected to the second input of AND gate 77, to one input of AND gate 81, and to a second noninhibiting input of INHIBITED-AND gate 67. The output of AND gate 92 is connected to an input of OR gate 69 and is connected by cable 33 to the punch-driving circuitry in card punch 34.

When space bar 73 on typewriter 30 is actuated, contacts 75 close to apply power from power line 52 to output line 79 which is coupled through terminal board 56, a conductor within cable 31 and terminal board 60 to a second input of AND gate 81, the output of which is tied to a third input of OR gate 69. If necessary, Start Punch control 86 can be connected to the appropriate circuitry of card punch 34 to activate the punch; however, receipt of a signal by punch 34 on line 33 may activate the punch, depending on details of the punch circuitry.

When the data is to be recorded, both typed on form 10 and punched on that form 10, the form 10 is inserted into typewriter 30, and switch 61 closed. In the queiscent condition, flip-flop 88 is reset, and stepping switch 72 is in its final position in which it applies an output on its last output line to the inhibiting inputs of INHIBITED-AND gates 65 and 67. Initiation of this reset output clears each memory location 70. The form 10 is inserted into typewriter 30 until the column 12 location of the first data line 16 is in the appropriate position to have data typed thereon, and Start Type control 87 is actuated, applying a signal through OR gate 63 to the reset input of stepping switch 72. In response, switch 72 steps to its first output line to apply an enabling signal to the first memory location 70 and to remove the inhibiting inputs from gates 65 and 67. Since flip-flop 88 remains reset, gates 77, 81 and 67 each receive an enabling input. The data for that first data line 16 is then typed. This data might include an account number, a code indicating whether that account is to be debited or credited, and a dollar amount.

As each typewriter key 40 is actuated, its associated contact 50 is closed to apply power from power line 52 to the associated encoder 66. In response, that encoder 66 applies an output through OR gate 68 and AND gate 77 to the input of each memory location 70. As the first data character is typed, stepping switch 72 is applying an enabling input to the first memory location 70. This enables that memory location 70 to store the coded representation of that first data character. The output from AND gate 77 passes through gates 69 and 65 to time delay 71 which, after a delay time sufficient to permit storage of the data character in the enabled memory location 70, applies a pulse to the step input of stepping switch 72. This terminates the output on the first output line of switch 70 and initiates an output on the next output line, thus enabling the next memory location 70 to store the next coded data character. By way of example, time delay 71 might be a monostable multivibrator so that if encoder 66 is applying the coded representation of the data characters as a serial train of pulses, the first pulse of that train triggers delay multivibrator 71 to its unstable state in which it remains during the reset of the pulse train and while the coded data character is being stored in the enabled memory location 70, with delay multivibrator 71 stepping the switch 72 to its next output line upon return of multivibrator 71 to its stable state.

The system need respond only as fast as a person is typing on typewriter 30, for example a maximum speed in the order of about 150 words per minute. If the system is able to respond to 1500 characters per minute, it thus will be sure to capture all the data characters typed on typewriter 30. Each data character might be represented by, for example, 8 data bits in the outputs from encoder 66. 1500 characters per minute would thus be 12,000 data bits per minute or 200 bits per second. Thus, a response time for memory 32 in the order of 5 milliseconds would be sufficient. Such a response time is well within the state of the art.

By way of illustration, a four-digit account number might be typed in the column 12 location of the first data line 16. With the typing of each digit of the account number, a new memory location 70 is enabled to store the digit. A coded character is then typed into the column 13 location of that line 16 to indicate whether the indicated account is to be debited or credited. The typewriter space bar is then actuated to move the carriage to the appropriate column 14 location in which to type the dollar amount to be debited or credited to that account number. The decimal points are preprinted in the column 14 locations so that the space bar is actuated the number of times required to position form 10 for typing the dollar amount, and this is dependent upon the number of digits in the dollar amount. Each time space bar 73 is actuated, contact 75 closes to apply a signal through gates 69 and 65 and delay 71 to step the switch 72. Thus, each space that the carriage is moved by actuation of space bar 73 causes the skipping of a memory location 70. Consequently, the appropriate memory location is enabled regardless of the number of digits in the dollar amount to be typed. The ZERO output of flip-flop 88 cleared all the memory locations 70 when flip-flop 88 was reset, and so no coded representations of digits is stored in the skipped memory locations 70. By way of example, the clear input to memory locations 70 could cause the storing therein of a code representation to which punch 34 does not respond.

After all of the data has been typed on the first line 16 of the data card 10, carriage return 74 is depressed to roll the typewriter platen one line, moving data card 10 so that the next data line 16 is in the appropriate position to have data typed onto it. In addition, of course, actuation of carriage return 74 returns the carriage to the position in which account number column 12 is positioned for receipt of data. Actuation of carriage return key 74 additionally closes contact 76 to apply an input to the skip input of stepping switch 72. This skip input causes stepping switch 72 to step to the appropriate output to enable the memory location 70 associated with the left-most digit in that next date line 16, thus assuring storage of the data in the proper memory location.

Data form 10 includes several data lines 16 for account numbers and accounts to be debited and credited. Consequently, if a check is to be made out representing the sum of several transactions, all of the necessary accounting data can be placed on that one form 10. Thus, for example, payroll checks can be made out showing as debits straight time pay, overtime pay, bonus or commission pay, and as credits the amount of the check, and the amounts credited to income tax withholding, to Social Secuity withholding, and to other types of withholding. All of the data is accordingly both written on check 10 and punched on the check. After all of the account debit and credit data has been typed, the carriage return key 74 is depressed the required number of times to position data line 17 for receipt of typed data. The skip input to stepping switch 72 assures that the proper memory location 70 is enabled regardless of the number of data lines 16 that have been used. Thus, whether only some of the data lines 16 have been used or all of the lines have been used, the proper memory location 70 is enabled when data line 17 is positioned for typing. A number identifying the company whose accounts are to be reconciled by the data processing firm to which check 10 is ultimately sent after reconciliation by the bank is typed into space 18. The next space 20 is provided to receive a check number. Next come spaces 22 for receipt of the date on which the check is written. A payee identification number space 24 is then provided, and this is followed by a space 26 in which the amount of the check is typed in numerals.

The several data spaces on form 10 are designed to consume the entire number of characters which can be punched onto the form 10. Thus, once the numerical designation of the amount of the check has been typed in space 26, stepping switch 72 has stepped to its last position in which it remains until reset. In this last position, switch 72 does not enable any of the memory locations 70 and does apply an inhibiting input to gates 65 and 67 so that further actuation of typewriter 30 does not affect memory 32. Since flip-flop 88 is already reset, the input from this last output of switch 72, through delay 87, to the reset input of flip-flop 88 has no effect on the system. The carriage of typewriter 30 is then moved to place line 27 of form 10 beneath the type, and the name of the payee is typed. The typewriter carriage is again moved to line 28, and the dollar amount of the check is typed out.

Check 10 is then removed from the typewriter and inserted into card punch 34, and Start Punch switch 86 is actuated. This resets stepping switch 72 to its first output removing the inhibiting inputs from gates 65 and 67, and sets flip-flop 88 to its ONE condition, applying an enabling input to AND gate 92 and removing the enabling input from gates 77, 81 and 67. The output from the first line of stepping switch 72 to the first memory location 70 enables that memory location to apply its output through OR gate 90 and AND gate 92 to output line 94 which applies the coded data character to card punch 34. The output from AND gate 92 also passes through gates 69 and 65 to delay circuit 71 which steps switch 72 to its second output. Consequently, the next memory location 70 is enabled and applies its output through gates 90 and 92 to card punch 34 and likewise to the step input of stepping switch 72. Thus each of the memory locations in turn is enabled to apply its coded data character through gates 90 and 92 to card punch 34. Card punch 34 punches a coded representation of the data character into form 10.

The code of the data characters as punched by card punch 34 into form 10 must be of a format recognizable by the automatic data processing system with which the forms 10 are to be utilized. Preferably, but not necessarily, the data character code representations generated by encoders 64 and stored in memory locations 70 are in a format recognizable by the drive or control circuitry of card punch 34. If this is not the case, then output line 33 from memory 32 applies the code representations to a code interpreter which actuates the appropriate punches of card punch 34. The data character code representations as punched by card punch 34 may or may not be the same as generated by encoders 66 for storage in memory locations 70. As stated, the code as punched by card punch 34 is determined by the data processing system with which the forms 10 are to be utilized, while, for optimum operation, the code as generated by encoders 66 is of a format recognizable by the drive circuitry of card punch 34.

After stepping switch 72 has enabled passage of the last data character from the last memory location 70 to card punch 34, stepping switch 72 is stepped to its last output line, once again inhibiting gates 65 and 67 and all the memory locations 70. After the delay of delay circuit 87, flip-flop 88 is reset, removing the enabling input from AND gate 92. The zero output of flip-flop 88 is applied to each memory location 70 to erase or clear the memory locations. In addition, the flip-flop 88 ZERO output enables gates 77, 81 and 67. Therefore, the system is returned to its quiescent condition.

While the above description of one utilization of the present invention has been with reference to commercial checks in which a single data form 10 is utilized for each check, there might be applications for the present invention in which a set of two or more data forms 10 might be associated with each transaction, for example, inventory control. In such case, two character locations on each data form can be reserved for code digits indicating the total number of data forms in the set and which of those the particular form is. Likewise, while a principle application of the present invention is in situations in which the data is typed on and punched in the same data form, as in the above representative description of a commercial check, there may be applications in which the data is typed on one form and punched into another. Nevertheless, the data recording system of the present invention is equally advantageous in such applications since the system assures that the punched data exactly corresponds with the typed data.

FIG. 3 is, of course, a simplified diagram, and complete mechanization of the data recording system of the present invention in accordance with the illustrative example of FIG. 3 may make desirable additional circuitry to assure design optimization and proper operation, as is well known to those skilled in the art, for example, gating, time delay, and buffering circuitry.

FIG. 3 illustrates one approach to mechanization of the present invention, and numerous other approaches are, of course, possible. Components suitable for use as the various components of the mechanization of FIGS. 1-3 can be readily obtained. By way of example, typewriter 30 can be a commercially available electric typewriter adapted to provide terminal board 56, and contacts 50, 75 and 76 for closure in response to activation of the associated keys. Card punch 34 and memory 36 can be commercially available devices suitably adapted for use in the present invention. By way of example, the IBM 129 key punch or the UNIVAC 1701 verifying punch might be adapted for use in the present invention as card punch 34 and memory 32. Each of these commercially available punches includes memory electronics, permitting their use as memory 32 and card punch 34. In such instance, the keyboard and numerous of the control functions of the commercially available punch can be removed, since they are not utilized in the system of the present invention.

Having typewriter 30 coupled to memory 32 by means of cable 31 and terminal boards 56 and 60 permits disconnection of the cable so that, if desired, typewriter 30 can be moved to other locations for regular typing usage. If such movement of typewriter 30 is not anticipated, terminal boards 56 and 60 can be omitted, with typewriter 30 hard-wired to memory 32. In either situation, typewriter 30 can be utilized for regular typing, simply by opening switch 61 to remove power from contacts 50, 75 and 76 and the memory circuitry. Consequently, typewriter 30 can be utilized as a regular typewriter in small businesses having the data recording system of the present invention, thereby minimizing the amount of equipment such businesses must have.

Numerous minor modifications can be made in the mechanization scheme depicted in FIG. 3, of which the following are representative. Data form 10 includes a space 18 for a number identifying the company generating form 10 on the records of the data processing service organization to which the forms 10 are sent for processing. If the company which generated form 10 has its own data processing system, then space 18 is unnecessary. If a data processing service organization is used so that space 18 is necessary, the identifying number entered in space 18 is always the same for a particular company. Consequently, this identifying number can be pre-printed on the blank form 10, and the number hardwired into memory 32 so that it is punched into the forms 10 without having to be typed onto each form 10. In such case, the skip input of stepping switch 72 upon actuation of carriage return key 74 to align data line 17 for typing causes stepping switch 72 to skip the hard-wired memory locations, and no clear input is applied to those memory locations from flip-flop 88. In any case stepping switch 72 is designed so that its skip inputs skip it to the proper output for each character line of the particular data form. This is, of course, dependent upon the design of the particular data form and the operating characteristics or programming of the automatic data processing equipment for which the data forms are to provide input data.

FIG. 3 depicts serial transmission of the data bits of each coded character from encoders 64 to memory locations 70. Parallel transmission could, of course, be utilized; however, since the system response time need not be fast, in the order of 40 milliseconds per character, serial transmission is satisfactory. Likewise, FIG. 3 depicts serial transmission of the characters from memory locations 70 to card punch 34 for serial or sequential punching. Parallel transmission could be utilized, permitting parallel or simultaneous punching of all, or a group, of the data characters, if a card punch 34 having such capability is utilized. Again, however, the system response time requirements do not necessitate parallel punching.

In the representative example of the commercial check, described above in conjunction with FIG. 1, only coded representations of numerals are punched into form 10. Consequently, in such an application, only the numeral character keys of typewriter 30 need be coupled to memory 32, along with the space bar and the carriage return. Therefore, in such system, only 10 encoders 66 are required, one for each of the numerals from zero to nine. If an application for the data recording systems requires punching coded representation of both alphabetical data characters and numerical data characters, then, of course, an encoder 66 is required for each such data character. In either case, the encoders 66 could be read-only memories, by way of example.

FIG. 3 depicts one set of memory locations, having a number of memory locations 70 equal to the number of characters which can be punched into data form 10. If desired, two such sets of memory locations can be provided, with switching equipment causing their alternate use so that as coded data is being punched into one form 10 from one set of memory locations 70, data is being typed onto the next form 10 and captured in the other set of memory locations 70.

The memory locations 70 can be any suitable components. As one example, each memory location 70 could be a set of flip-flops equal in number to the maximum number of data bits might be found in any of the data characters, together with appropriate gating and stepping circuitry to assure storage of each data bit in the appropriate flip-flop. Other, more sophisticated and less costly memory devices could, of course, be utilized instead.

FIG. 3 depicts a system in which each actuation of carriage return 74 is sensed to cause stepping switch 72 to skip, to apply an enabling input to the proper memory location 70 for the commencement of the next data line. Consequently, if less than all the data lines 16 are utilized, still the data of spaces 18-26 are stored in the properly corresponding memory locations 70, and the typed out name of the payee and amount of the check from spaces 27 and 28 are not captured in memory 32. Other ways of achieving this could be utilized. By way of example, since spaces 22-26 are the only data spaces extending to the right of the right-most edge of amount column 14, a contact could be added to typewriter 30 to sense movement of the typewriter carriage beyond the right-most edge of column 14, and circuitry provided to inhibit the capturing of characters in memory 32 following the next carriage return.

It can thus be seen that while one mechanization approach has been described in detail, the data recording system of the present invention can be implemented in any of numerous manners. Accordingly, although the present invention has been described with reference to preferred embodiments, numerous modifications and rearrangements can be made, and still the result would be within the scope of the invention.

What is claimed is:

1. A system for recording data characters on a form in a written representation, permitting use of the form as a business document, and in a punched code representation, permitting use of the form as a data processing system input device, said system comprising:

first means for generating written representations of data characters on the form in any locations desired for making the form usable as a business document, said means comprising a typewriter having a plurality of character keys, each character key corresponding uniquely with a data character, each character having sensing means for sensing actuation of the character key;

second means for generating first coded representations of the data characters which are defined by the generation of said written representations of data characters by said first means, said means comprising encoding means responsive to the sensing means for generating the first coded representation of the data character associated with an actuated character key;

memory means coupled to the second means for storing the first coded representations of the data characters;

card punch means coupled to the memory means for receipt therefrom of the first coded representations of the data characters for punching second coded representations of the data characters in the form in locations making the form usable as an input device for a data processing system; and control means for said memory means capable of alternatively assuming a first state in which said memory means is enabled to store the first coded representations of the data characters and a second state in which said memory means is enabled to apply the stored first coded representations of the data characters to said card punch means.

2. A method of providing a form having thereon coded representations of data characters, permitting use of the form as a data processing system input device, and written representations of the same data characters, permitting use of the form as a business document, said method comprising:

inserting the form into a typewriter, said typewriter being coupled to a memory device;

typing on the form written representations of data characters in any locations desired for making the form usable as a business document;

capturing in the memory device a first set of coded representations of the data characters by sensing the actuation of each character key, generating a coded representation of each actuated character key, and storing each coded representation in a memory location;

transferring the form from the typewriter to a punching device also coupled to the memory device; and applying the first set of coded representations of the data characters from the memory device to the punching device to activate the punching device to punch in the form a second set of coded representations of the data characters in locations making the form usable as an input device for a data processing system.

* * * * *